Dec. 10, 1940.   A. RUNYAN   2,224,523
MICA PRODUCT
Filed May 31, 1939
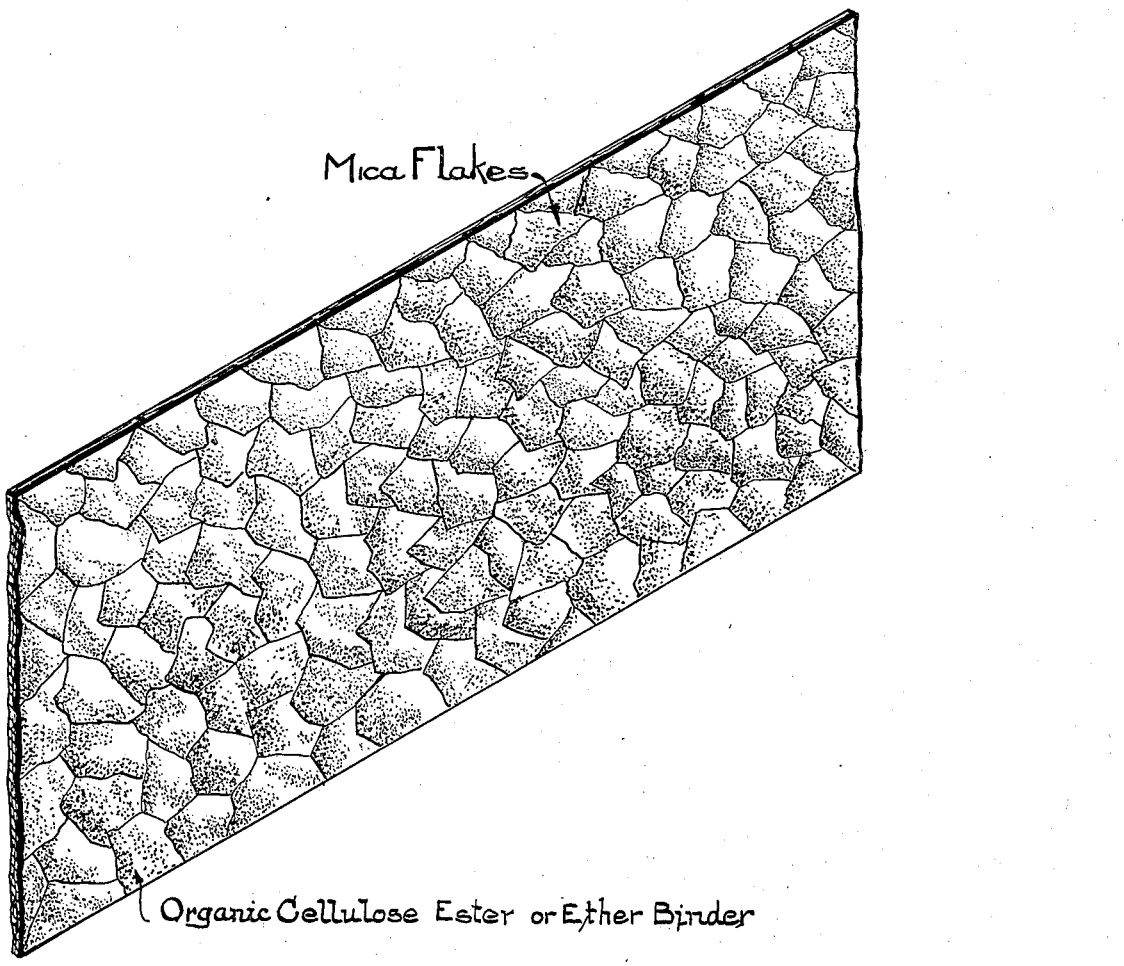
Inventor
Arthur Runyan
by his Attorneys.
Howson & Howson

UNITED STATES PATENT OFFICE 2,224,523

MICA PRODUCT

Arthur Runyan, Valparaiso, Ind., assignor to Continental-Diamond Fibre Company, Newark, Del., a corporation of Delaware Application May 31, 1939, Serial No. 276,717

4 Claims. (Cl. 154—2.6)

My invention relates to a laminated mica product, and more particularly it relates to a product comprising assembled mica flakes bound together in the form of a desired product by a binder which imparts novel characteristics thereto.

Heretofore laminated mica products have been prepared using shellac, varnishes, gums and certain synthetic resins, such as a polybasic acid-polyhydric alcohol resin, (glyptol) as the binder. All of these binders tend to soften and flow when subjected to the degree of heat encountered in a number of electrical applications and in the course of processing and operation of various types of electrical equipment. For example, in the manufacture of mica commutator rings, the temperature used in the process of curing the commutators during their manufacture is sufficiently high so that the shellac, resin or other bond, either flows or softens to such an extent that movement or slippage of the mica flakes occurs. Another instance in which difficulty has been encountered is in the insulation of electrical coils, where in the production of certain types, operating temperatures are relatively high, and, therefore, there is a marked tendency for the binder to flow from the mica insulation during the processing of the coils or during the operation of the finished machine containing the coil.

One object of the present invention is to provide a laminated mica product, the laminae of which are bound together by a binder which does not melt or flow at the temperatures encountered under any normal manufacturing or operating conditions.

Another object of the present invention is to provide a mica product comprising mica flakes bound together in predetermined desired form by a binder which has high electrical insulation value, and is heat-resistant, non-inflammable, and resistant to acid, alkali, and salt conditions, the latter property providing a product posessing no corrosive action in contact with wires or other metallic parts of the equipment in which the mica product is employed.

Still another object is to furnish a mica product in which the mica flakes are adhered together by a binder whose melting point is higher than the operating or processing temperatures of the parts insulated, with the advantageous result that no curing of the binder is required, as is necessary with shellac, and a greater production can, therefore, be obtained from the molds or presses, since the cycle of manufacture is shortened.

Other objects will be apparent from a consideration of the specification and claims.

In the accompanying drawing a mica product, the mica flakes of which are bound by an organic cellulose ester or ether, is illustrated in perspective.

The above-mentioned desirable properties are obtained in a mica product in accordance with the present invention by the use of a cellulose ether or ester of an organic acid as the binder for the mica flakes. Examples of organic ethers or esters of cellulose that are applicable for use are ethyl, propyl, butyl, and benzyl cellulose and like ethers, and cellulose acetate, propionate and butyrate, and like esters. The use of cellulose ethers is preferred, and of these ethyl cellulose is particularly advantageous. All of the compounds of the type named possess high insulation value which remains constant in use, since the binders are resistant to heat and light, and, therefore, are not broken down by the action of actinic and ultra violet rays, or by the application of continued heat. In addition, the binders have a higher resistance to carbonization when exposed to an electric arc. Furthermore, these binders are resistant to acid, alkali and salt conditions, and thus a product is available which possesses no corrosive action on wires and other metallic parts in contact with the mica product. These binders are characterized by a melting and softening point above any normal operating temperatures, and hence softening of the binder does not occur, or is minimized, so that the mica flakes stay in place and no damage to the product results even when relatively high temperatures are encountered. In addition, the binders contemplated herein wet the mica particularly well, and hence produce a product with a stronger mica-binder interface than has previously been the case.

The product of the present invention may be prepared by dissolving the organic cellulose ethers or esters in a suitable organic solvent, and thereafter applying the binder to the mica flakes in accordance with conventional practice. During the pressing or molding of the product, such as commutator rings, the assembled mica product is subjected to a higher temperature in the pressing step than is usually employed, since the temperature used must be at or above the melting point of the binder. The amount of binder employed will depend on the particular use for which the product is intended, and usually the same amount of the cellulose ether or ester binder is employed in a particular product as has been customary in the case of other binders.

It will be obvious that other organic esters or ethers of cellulose may be employed in place of those specifically mentioned herein, and that various steps may be used in the production of the mica product, without departing from the essential features of the invention.

I claim:

1. A laminated mica product, the mica flakes of which are bound together by a material selected from the group consisting of organic cellulose ethers and esters.

2. A molded laminated mica product, the mica flakes of which are bound together by a material selected from the group consisting of organic cellulose ethers and esters.

3. A molded laminated mica product, the mica flakes of which are bound together by a cellulose ether.

4. A molded laminated mica product, the mica flakes of which are bound together by ethyl cellulose.

ARTHUR RUNYAN.